(12) United States Patent
Guido et al.

(10) Patent No.: US 9,080,517 B2
(45) Date of Patent: Jul. 14, 2015

(54) SYSTEM AND METHOD FOR SUPPLYING FUEL TO AN ENGINE VIA MULTIPLE FUEL PATHS

(75) Inventors: Samuel James Guido, Dearborn, MI (US); Joseph Norman Ulrey, Dearborn, MI (US); Ed Badillo, Flat Rock, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 937 days.

(21) Appl. No.: 13/277,774

(22) Filed: Oct. 20, 2011

(65) Prior Publication Data

US 2013/0103286 A1     Apr. 25, 2013

(51) Int. Cl.
| | |
|---|---|
| *F02D 19/08* | (2006.01) |
| *F02D 41/30* | (2006.01) |
| *F02D 41/00* | (2006.01) |
| *F02D 41/24* | (2006.01) |
| *F02D 41/26* | (2006.01) |
| *F02D 19/06* | (2006.01) |

(52) U.S. Cl.
CPC ........ *F02D 19/0602* (2013.01); *F02D 19/0647* (2013.01); *F02D 41/0027* (2013.01); *F02D 41/266* (2013.01); *F02D 41/3005* (2013.01); *Y02T 10/36* (2013.01)

(58) Field of Classification Search
CPC ............................ F02D 19/0602; F02D 41/266
USPC .................. 701/102, 103, 104; 123/304, 698, 123/575–578, 179.7–179.8
See application file for complete search history.

(56) References Cited

U.S. PATENT DOCUMENTS

| | | | | |
|---|---|---|---|---|
| 5,092,305 | A | * | 3/1992 | King .............................. 123/575 |
| 5,339,782 | A | * | 8/1994 | Golzer et al. ................. 123/399 |
| 5,379,740 | A | * | 1/1995 | Moore et al. .................. 123/478 |
| 5,713,336 | A | | 2/1998 | King et al. |
| 5,735,253 | A | * | 4/1998 | Perotto et al. ............ 123/406.47 |
| 6,145,494 | A | | 11/2000 | Klopp |
| 6,543,423 | B2 | | 4/2003 | Dobryden et al. |
| 6,668,804 | B2 | | 12/2003 | Dobryden et al. |
| 7,363,129 | B1 | * | 4/2008 | Barnicle et al. .................... 701/1 |
| 7,546,834 | B1 | | 6/2009 | Ulrey et al. |
| 7,607,422 | B2 | * | 10/2009 | Carlson et al. ................ 123/672 |
| 7,918,207 | B2 | | 4/2011 | Pursifull et al. |
| 8,118,006 | B2 | | 2/2012 | Pursifull |

(Continued)

FOREIGN PATENT DOCUMENTS

| | | |
|---|---|---|
| EP | 872634 A1 * | 10/1998 |
| WO | 0041905 A1 | 7/2000 |

OTHER PUBLICATIONS

Visteon, Compressed Natural Gas-Ready Powertrain Control Module, Mar. 29, 2006, brochure.

(Continued)

*Primary Examiner* — Hieu T Vo
*Assistant Examiner* — Arnold Castro
(74) *Attorney, Agent, or Firm* — Julia Voutyras; Alleman Hall McCoy Russell & Tuttle LLP

(57) ABSTRACT

A system and method for supplying fuel to an engine is disclosed. In one example, a first controller supplies injector commands to a second controller via an asynchronous serial communication bus. The system may reduce the complexity of supplying two or more fuels to an engine.

17 Claims, 5 Drawing Sheets

(56) References Cited

U.S. PATENT DOCUMENTS

| | | |
|---|---|---|
| 2004/0025831 A1* | 2/2004 | Landi et al. ............... 123/304 |
| 2004/0139944 A1 | 7/2004 | Nakano et al. |
| 2004/0249552 A1* | 12/2004 | Di Cola et al. ............ 701/103 |
| 2006/0235601 A1* | 10/2006 | Uruno et al. .............. 701/102 |
| 2006/0259231 A1* | 11/2006 | Ichikawa et al. .......... 701/115 |
| 2009/0287393 A1* | 11/2009 | Moller et al. .............. 701/103 |
| 2010/0318277 A1 | 12/2010 | Pursifull et al. |
| 2011/0066781 A1* | 3/2011 | Debelak et al. ........... 710/110 |
| 2011/0125386 A1 | 5/2011 | Pursifull |
| 2011/0288745 A1* | 11/2011 | Warner et al. ............. 701/103 |
| 2012/0004824 A1* | 1/2012 | Milton et al. .............. 701/103 |
| 2012/0109496 A1* | 5/2012 | Hylands et al. ........... 701/103 |
| 2012/0173058 A1* | 7/2012 | Books et al. ................ 701/22 |
| 2012/0253641 A1* | 10/2012 | Warner et al. ............. 701/104 |

OTHER PUBLICATIONS

Wolff, William et al., Ford Motor Company, Ford's 2003 F-150 Bi-Fuel Next Generation Control System, 2003, presentation.

\* cited by examiner

SYSTEM AND METHOD FOR SUPPLYING FUEL TO AN ENGINE VIA MULTIPLE FUEL PATHS

FIELD

The present description relates to supplying fuel to an engine. The system and method may be particularly useful for engines that are supplied fuel from two or more sources via multiple fuel delivery paths.

BACKGROUND AND SUMMARY

It may be desirable to provide two types of fuel to an engine or to supply a single type of fuel via different fuel paths that provide different advantages and/or disadvantages. For example, during some conditions it may be desirable to operate an engine with gasoline while during other conditions it may be desirable to operate the engine with a gaseous fuel such as compressed natural gas (CNG). Alternatively, it may be desirable to supply an engine with two fuels that have different octane levels so that higher octane fuel may be conserved for high load conditions and less expensive low octane fuel can be used during low load conditions. A system where two fuels or fluids are injected to an engine may offer the most flexibility when separate injectors are provided for each fuel at each cylinder.

However, doubling a number of injectors supplying fuel to an engine can increase the cost and complexity of an engine controller and may not be feasible in some cases because of packaging constraints. One way to overcome controller packaging limitations and supply two fuels to an engine is to place a secondary controller in electrical communication with a first or primary controller. In this arrangement, the secondary controller can provide outputs to control the secondary fuel system.

One way to place the secondary controller in electrical communication with the primary controller is for the secondary controller to monitor primary controller outputs for each primary fuel injector that the primary controller is operating. The secondary controller can provide outputs to control secondary fuel injectors based on the outputs for the primary fuel injectors. For example, where the primary fuel injected is gasoline and the secondary fuel injected is CNG, fuel injector outputs of the secondary controller can be adjusted proportionately with the fuel injector outputs of the primary controller that are monitored by the secondary controller so as to provide a desired engine air-fuel ratio. Although such a system may be functional, it may require numerous electrical connections between the primary and secondary controllers. Further, such a system may not be as beneficial when it is desirable to inject two fuels to the engine during a single engine cycle since outputs to the secondary fuel injector are tied to outputs driving the primary fuel injectors.

The inventors herein have recognized the above-mentioned disadvantages and have developed an engine system, comprising: a first group of fuel injectors; a second group of fuel injectors; a serial communication bus; a first controller including instructions for directly driving the first group of fuel injectors and supplying commands via the serial communication bus to operate the second group of fuel injectors; and a second controller including instructions for receiving the commands via the serial communication bus and directly driving the second group of fuel injectors.

By communicating fuel injector pulse width for a plurality of fuel injectors over a sole asynchronous serial communication bus (e.g., a CAN bus), it may be possible to reduce a number of electrical connections between two controllers that each directly control separate groups of fuel injectors. For example, when multiple fuel pulse widths can be transmitted between two or more controllers over a single wire pair serial communication bus, a number of electrical connections may be reduced from n to 1, where n is a number of fuel injectors in the engine system.

Further, when fuel injector pulse widths are properly sent over a serial communication bus, fuel injectors controlled via a first controller may be operated differently than fuel injectors controlled via a second controller. For example, where a first fuel injector supplies gasoline to a cylinder and a second fuel injector supplies alcohol to the same cylinder, the first controller may directly operate the first fuel injector at a first fuel pulse width, and the second controller may directly operate the second fuel injector at a second pulse width. In this way, fuel injectors may be operated differently even though commands for both groups of fuel injectors originate from the first controller.

The present description may provide several advantages. Specifically, the approach may reduce wiring and system complexity where two injectors supply fuel to a single cylinder of an engine. In addition, the approach may reduce system cost since a controller originally designed to control supply of a single fuel to an engine can be converted to operate an engine with two fuels by simply electrically coupling a second controller to a serial communication bus of the first controller. Further, the approach may reduce system development time since instructions for operating fuel injectors may be integrated with existing instructions of a controller designed to control injection of a single fuel.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
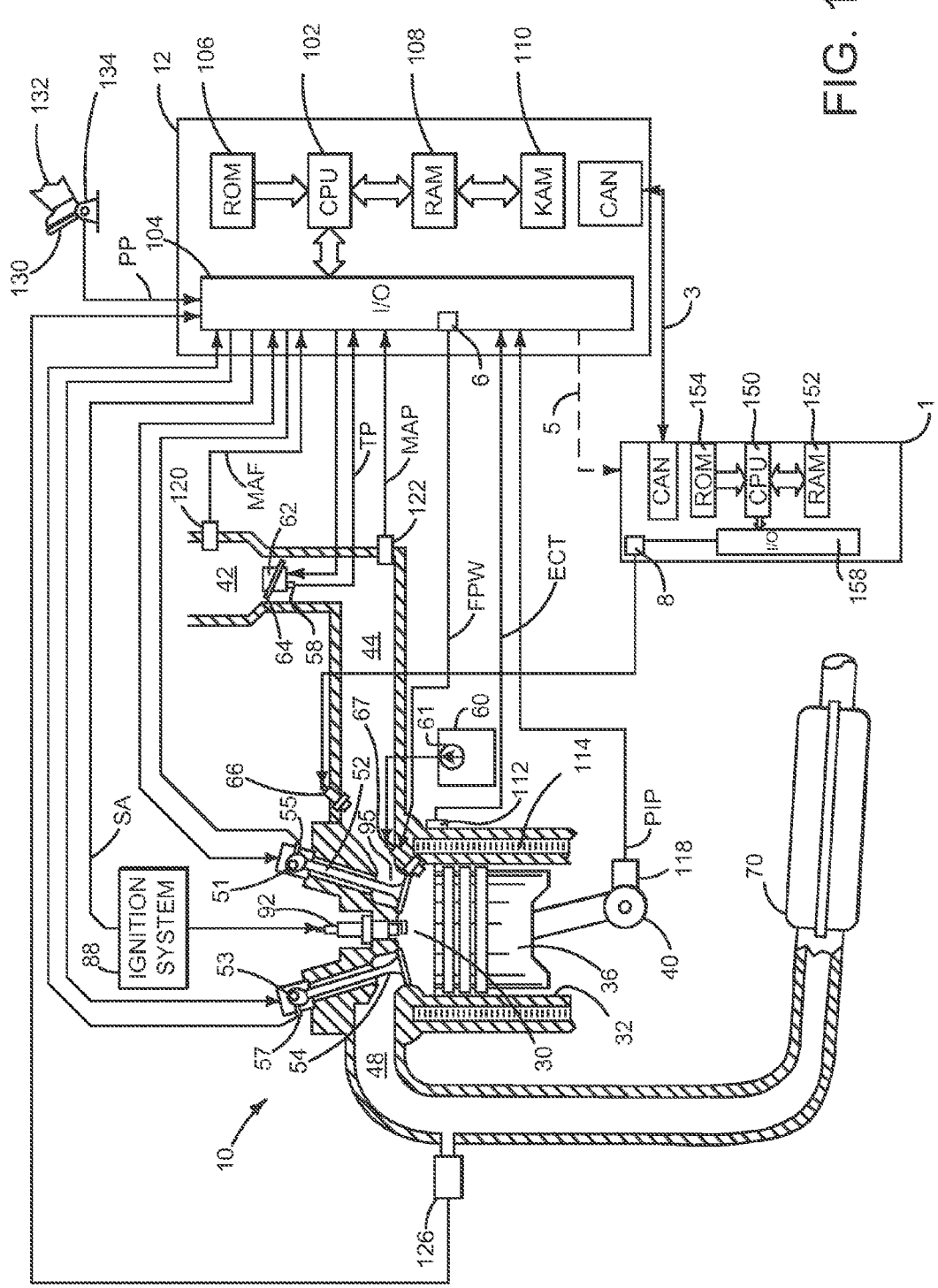
FIG. 1 is a schematic diagram of an example engine.
Figure 2:
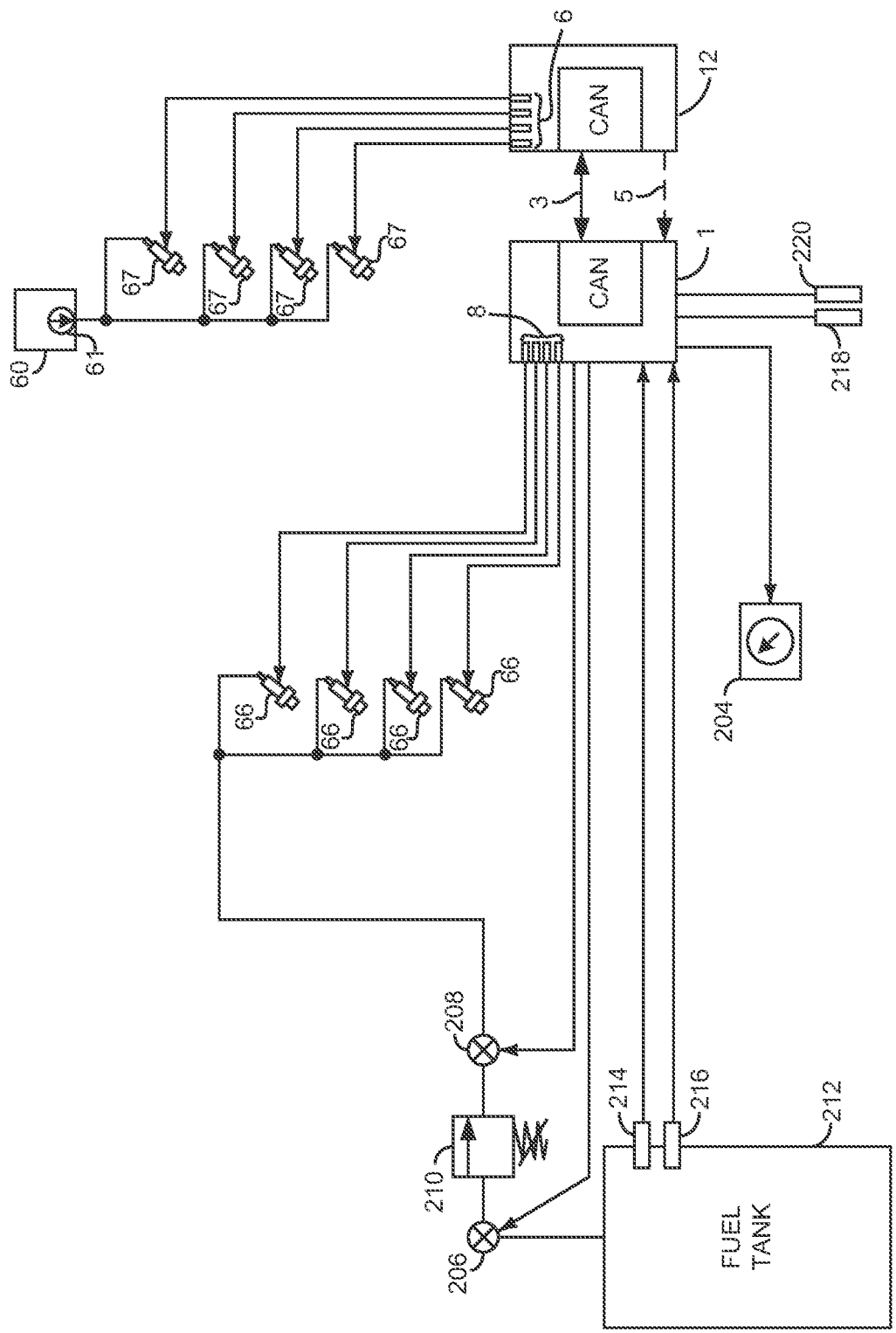
FIG. 2 is detailed example of a fuel delivery system.
Figure 3:
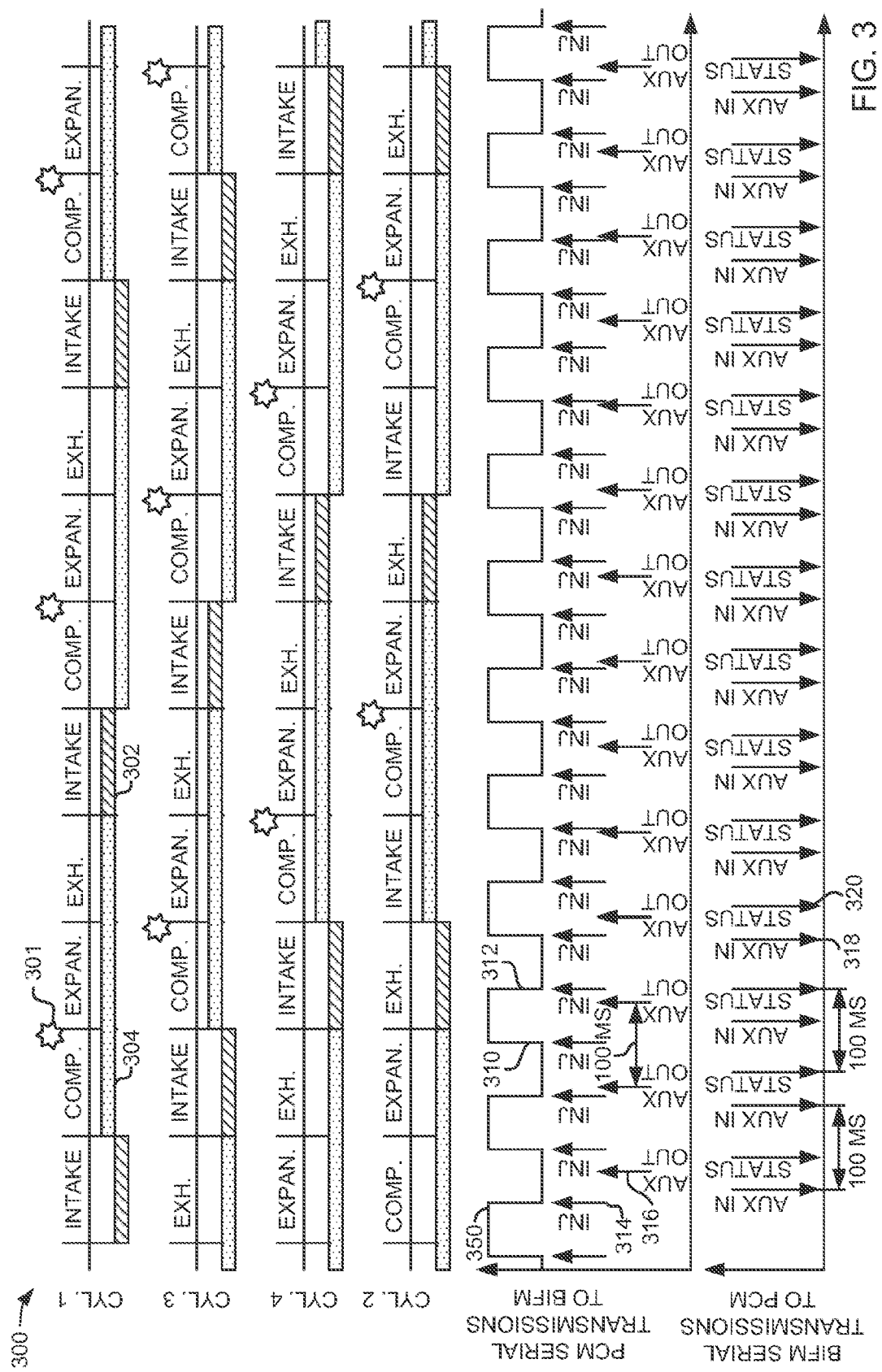
FIG. 3 is a simulated timing sequence for sending fuel injection timing via a sole serial communication bus.

The present description is related to systems and methods for supplying fuel to an engine. In one example, a fuel system may provide fuel to an engine as shown in FIG. 1. FIG. 2 provides a detailed example of a fuel system for supplying fuel to an engine. Simulated example timings for broadcasting and receiving fuel injector control commands over an asynchronous serial communication bus are shown in FIG. 3. The signals of FIG. 3 may be provided according to the methods of FIGS. 4 and 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

First fuel injector 66 is shown positioned to inject fuel into an intake port 95 of cylinder 30, which is known to those skilled in the art as port injection. In other examples, fuel injector 66 may inject fuel directly into combustion chamber 30, which is known as direct injection to those skilled in the art. Fuel injector 66 delivers gaseous fuel in proportion to the pulse width of signal FPW from controller 12. In other examples, fuel injector 66 may inject liquid fuel. Fuel injector 66 is directly operated via secondary fuel controller 1. Specifically, driver 8 supplies current to activate fuel injector 66. In other examples, driver 8 may electrically adjust a hydraulic pressure supplied to fuel injector 66. Driver 8 may be a FET, MOSFET, bi-polar, or other type of driver. Secondary fuel controller 1 includes CPU 150, RAM 152, ROM 154, and I/O 158. Secondary fuel controller 1 is in communication with controller 12 via serial communication bus 3. Controller 12 may also provide a digital signal to secondary fuel controller 1 that repeats a pattern every cycle of engine 12.

Fuel may also be supplied to engine 10 via a second fuel injector 67. Fuel injector 67 injects fuel directly into combustion chamber 30. In alternative examples, fuel injector 67 may be a port fuel injector. Fuel is delivered to fuel injector 67 by a fuel system including a fuel tank 60, fuel pump 61, and fuel rail (not shown). Fuel injector 67 may be supplied with a same type of fuel as fuel injector 66. Alternatively, fuel injector 67 may be supplied with a different type of fuel than fuel injector 66. Fuel injector 67 is supplied operating current from driver 6 of controller 12. Driver 6 directly operates injector 67 via supplying current to injector 67. In other examples, driver 6 may electrically adjust hydraulic pressure supplied to fuel injector 67. Driver 6 may be a FET, MOSFET, bi-polar, or other type of driver.

In one example, serial communication bus 3 includes nodes where different controllers may broadcast messages over the communication bus. At each node, messages may be sent and received but not simultaneously. Each message broadcast over the bus includes an identifier that sets the priority of the message and message data. If the communication bus is free of messages any controller attached to the communication bus may broadcast. If two or more controllers broadcast messages at the same time, the message with the dominant identifier overwrites the other identifies so that only the dominant identifier is left and the remaining controllers monitor the communication bus rather than broadcast over the communication bus. Thus, the serial communication bus has priority based arbitration. In this example, controller 12 broadcasts fuel injector timing messages with the highest level of priority so that accurate fuel injection timing is possible. However, it may be possible to broadcast fuel injection timings with slightly lower priority during some conditions. The fuel injector pulse width data is initially sent and updated at an engine rate (e.g., number of engine cylinders*2 each 720 crankshaft degrees). The time arrival of the fuel injector pulse width data encodes the engine position for scheduling fuel injection on and off times with respect to crankshaft angle. Pulse width and engine speed are included in the message sent over the serial communication bus. The arrival of the data packet (e.g., including the fuel injector pulse width) along with engine speed are used for estimating engine position between engine position updates.

Intake manifold 44 is shown communicating with optional electronic throttle 62 which adjusts a position of throttle plate 64 to control air flow from air intake 42 to intake manifold 44. Optionally, a mechanically controlled throttle may be provided.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring to FIG. 2, a detailed example of a fuel delivery system is shown. The fuel delivery system includes two groups of fuel injectors comprised of fuel injectors 66 and fuel injectors 67. Fuel is supplied from fuel tank 60 to fuel injectors 67 via fuel pump 61. Fuel is supplied from fuel tank 212 to fuel injectors 66 via fuel control valves 206 and 208 via pressure regulator 210. Fuel pressure of fuel tank 212 is sampled via pressure sensor 214 and supplied to secondary fuel controller 1. Fuel temperature is sampled via temperature sensor 216 and supplied to secondary fuel controller 1. Temperature at the point of the engine where fuel is injected is sampled via temperature sensor 218 and supplied to secondary fuel controller 1. Pressure at the point of the engine where fuel is injected is sampled via pressure sensor 220 and supplied to secondary fuel controller 1. Secondary fuel controller 1 may provide a signal to operate fuel level gauge 204.

Controller 12 directly operates injectors 67 via drivers 6 shown integrated in controller 12. Controller 12 provides fuel injection pulse width commands to secondary fuel controller 1 via serial communication bus 3. Serial communication bus 3 may be a controller area network (CAN). Controller 12 also may provide a digital signal to secondary fuel controller 1 via line 5. Line 5 may provide a digital pattern that repeats every two engine revolutions or every engine cycle. Secondary fuel controller 1 directly operates injectors 66 via drivers 8 responsive to data packets transmitted by controller 12 to secondary fuel controller 1 via sole serial communication bus 3.

Referring now to FIG. 3, a simulated timing sequence for sending fuel injection data and timing via a sole serial communication bus is shown. Sequence 300 may be provided via controller 12 and secondary fuel controller 1 of FIG. 1 executing instructions for the methods of FIGS. 4 and 5 in the system of FIG. 1. Sequence 300 illustrates operation of a serial communication bus between an engine controller and a secondary fuel controller of a four cylinder four cycle engine having a combustion order of 1-3-4-2. Time begins at the left side of FIG. 3 and increases to the right side of FIG. 3.

The first four plots from the top of FIG. 3 describe the strokes of cylinders 1-4 as the engine rotates. Intake strokes are abbreviated as INTAKE, compression strokes are abbreviated COMP., expansion strokes are abbreviated EXPAN, and exhaust strokes are abbreviated EXH. Star 301 and similar stars represent spark timing intervals for the cylinders.

Shaded area 304 represents an angular interval where fuel injection may be provided for closed intake valve injection for port fuel injection to cylinder number one. Fuel injection timings (e.g., pulse widths) for cylinder number one may also be supplied to secondary fuel controller 1 for operating fuel injectors. Areas similar to shaded area 304 are provided for cylinders 2-4 to show fuel injection timing intervals for these cylinders as well, and the timing of the areas is adjusted for the phase difference between engine cylinders.

Shaded area 302 represents an angular interval where fuel injection may be provided for a port fueled engine when engine load increases so that additional fuel may be injected to the cylinder to compensate for the higher engine load. For example, a portion of an amount of fuel delivered during a cylinder cycle may be delivered during the time of shaded interval 304 and additional fuel may be provided during an increase in engine load during the time of shaded interval 302. In cases where the secondary fuel controller operates direct injectors, fuel may be injected during cylinder intake stroke or compression stroke.

Fuel may be injected at similar times as described above for primary fuel injectors that are operated directly by a primary controller. Further, primary fuel injectors and secondary fuel injectors may supply fuel to the engine at different timings.

The fifth plot from the top of FIG. 3 represent timing of signals broadcast by controller 12 to secondary fuel controller 1. In one example, pulse train 350 is produced within controller 12 and is based on cam and crankshaft signals. Pulse train 350 includes one pulse for every cylinder during a cycle of the engine. Thus, for a four cylinder, four cycle engine, two pulses are provided every engine revolution. The rising edge 310 and falling edge 312 occur at predetermined crankshaft angles. In some examples, edges 310 and 312 may be referred to as profile ignition pickup (PIP) edges. For example, rising edge 310 occurs 10 crankshaft degrees before top-dead-center compression stroke of cylinder number one. Falling edge 312 occurs 80 crankshaft degrees after top-dead-center compression stroke of cylinder number one. The remaining pulses of pulse train 350 occur at similar crankshaft angles with respect to cylinder numbers 2-4. Thus, pulse train 350 repeats every engine cycle and is synchronous with engine position.

Controller 12 outputs or broadcasts injector timing (e.g., injector pulse width, start of injector opening timing in crankshaft degrees, and/or stop of injector opening timing in crankshaft degrees) for each fuel injector operated by secondary fuel controller 1 over an asynchronous serial bus. Although the bus in unsynchronized, controller 12 transmits messages over the serial link at intervals that are synchronous with engine timing (e.g., at each PIP edge). Since the messages that are sent at PIP edge rate with a high priority, there is little latency time between time the messages are sent and received. Transmitting the fuel injector pulse width data at PIP edge rate allows fuel injectors to operate within 10 crankshaft degrees of demanded timing which is acceptable at least for port fuel injection. In some examples, injector opening timings for all injectors are broadcast in a single data packet. In other example where the number of fuel injectors exceeds a threshold number, injector timings may be broadcast over the asynchronous serial bus in a plurality of data packets during an engine cycle. Injector timing commands are broadcast at predetermined crankshaft intervals corresponding to the rising and falling edges of pulse train 350. A single fuel pulse width may be updated every PIP edge as a cylinder air charge estimate is refined during engine rotation.

Controller 12 also outputs data or commands for controlling auxiliary outputs other than fuel injector timings. In one example, data or commands for controlling auxiliary outputs is broadcast at predetermined times rather than at predetermined crankshaft intervals like fuel injector commands. For example, auxiliary output commands may be output every 100 ms. Thus, the auxiliary outputs may have lower priority as compared to fuel injector timings. Auxiliary outputs may include but are not limited to solenoid valve opening and closing commands, fuel gauge output command, and PCM diagnostic codes.

In the example of FIG. 3, arrow 314 and similar arrows are identified with the INJ abbreviation. Arrow 314 represents timing when injector timing updates are provided by controller 12 to secondary fuel controller 1 via the asynchronous serial bus. Thus, it can be seen that fuel injector timing updates are provided each rising and falling edge of pulse train 350. In one example, the fuel injector timings are provided with a high priority identifier so that the messages may be received in a timely manner by the secondary fuel controller. By broadcasting fuel injection timings at every rising and falling edge of pulse train 350, fuel timings may be updated so that the injected fuel amount is updated in response to transient engine operating condition where engine load changes. In one example, a fuel injector timing message has a structure of:

```
struct Msg020t
{
U32 sync_ctr: 4;
U32 pip_edge: 1;
U32 pcm_t: 18;
U32 inj_offset: 8;
U16 fuel_pw0;
U16 fuel_pw1;
} Msg020;
```

Where Msg020 is the message number; where U32 represents an unsigned 32 bit structure that holds variables sync_ctr, pip_edge, pcm_t, and inj_offset; where sync_ctr is the cylinder number for which the present pulse represents a compression stroke (e.g., identifies to which cylinder the rising and falling edges of pulse train 350 (where fuel injector timings are broadcast) are associated); where pip_edge identifies whether the fuel injector timing message was broadcast by controller 12 at a rising or falling edge of pulse train 350; where pcm_t is the time when the message was broadcast by controller 12 to controller 1; where inject_offset is an injector pulse width offset; where fuel_pw0 is the fuel pulse width for the fuel injector providing fuel to cylinder number one; and where fuel_pw1 is the fuel pulse width for the fuel injector providing fuel to cylinder number two. Fuel injector timing messages for other engine cylinders may be similarly provided.

Arrow 316 and similar arrows are identified with the AUX OUT abbreviation. Arrow 316 represents timing when commands for controlling auxiliary outputs are provided by controller 12 to secondary fuel controller 1 via the asynchronous serial bus. Thus, it can be seen that auxiliary outputs are provided according to time and this example at 100 ms between updates. By broadcasting auxiliary output updates every 100 ms it is possible to reduce the number of messages broadcast over the serial communication bus. Further, in some examples, the auxiliary output messages may be sent at a lower priority than the fuel injection timing messages. In one example, an auxiliary output message has a structure of:

```
struct Msg130t
{
U8 : 6;
U8 FRS: 1;
U8 FTS: 1;
U8 res[7];
} Msg020;
```

Where Msg130 is the message number; where U8 represents an unsigned 8 bit structure that holds variables FRS and FTS; where six bits of the first byte are unused; where FRS is a commanded state of a fuel regulator solenoid; where FTS is a commanded state of a fuel tank solenoid; and where the remaining seven bytes are reserved.

The sixth plot from the top of FIG. 3 represents timing of signals broadcast by secondary controller 1 to controller 12. In one example, messages broadcast by secondary controller 1 are broadcast at fixed time intervals (e.g., every 100 ms). Further, some messages may be broadcast at different rates than other messages.

Secondary controller 1 outputs or broadcasts auxiliary inputs (e.g., fuel pressure and temperature where fuel is injected) over the asynchronous serial bus. Secondary controller 1 also outputs status data to controller 12. For example, secondary controller can identify degraded injector operation and notify the primary controller of the degradation.

In the example of FIG. 3, arrow 318 and similar arrows are identified with the AUX IN abbreviation. Arrow 318 represents timing when auxiliary input updates are provided by secondary fuel controller 1 to controller 12 via the asynchronous serial bus. Thus, it can be seen that auxiliary fuel injector timing updates are provided at predetermined intervals of time. In this example, the auxiliary input data is provided to controller 12 every 100 ms, although auxiliary input data may be broadcast at other intervals. In one example, the auxiliary input message has a structure of:

```
struct Msg140t
{
U16 FTP;
U16 FRP;
U8 FTT;
U8 FRT;
U8 res[2];
} Msg020;
```

Where Msg140 is the message number; where U16 represents an unsigned 16 bit structure; where FTP is fuel tank pressure stored in two bytes; FRP is fuel rail pressure stored in two bytes; FTT is fuel tank temperature stored in one byte; FRT is fuel rail temperature stored in one byte; and where two bytes are reserved.

Arrow 320 and similar arrows are identified with the label STATUS. Arrow 320 represents timing when data for controller status is provided by secondary fuel controller 1 to controller 12 via the asynchronous serial bus. Thus, it can be seen that controller status updates are provided according to time and this example at 100 ms between updates. By broadcasting controller status updates every 100 ms, it is possible to reduce the number of messages broadcast over the serial communication bus. In one example, a status message has a structure of:

```
struct Msg141t
{
U16 injA_degraded: 2;
U16 injB_degraded: 2;
U16 injC_degraded: 2;
```

```
    U16 injD_degraded: 2;
    U16 injE_degraded: 2;
    U16 injF_degraded: 2;
    U16 injG_degraded: 2;
    U16 injH_degraded: 2;
    U16 injI_degraded: 2;
    U16 injJ_degraded: 2;
    U16 FRS_degraded: 2;
    U16 FTS_degraded: 2;
    U8 res[5];
} Msg020;
```

Where Msg141 is the message number; where U16 represents an unsigned 16 bit structure that holds variables injA-J_degraded, FRS_degraded, and FTS_degraded; where injA-J are two bit variables identifying operating status of fuel injectors A-J, where FRS_degraded is a two bit variable for status of a fuel regulator solenoid; where FTS_degraded is a two bit variable for status of a fuel tank solenoid; and where the remaining 5 bytes are reserved.

Thus, secondary fuel controller 1 and controller 12 may broadcast messages to each other over the serial communications bus 3. Further, controller 12 broadcasts messages at timings that are coincident with specific engine crankshaft positions as well as at predetermined time intervals to secondary fuel controller 1. On the other hand, secondary fuel controller 1 broadcasts status information and fuel system specific inputs at predetermined time intervals to controller 12.

The timings shown in FIG. 3 are representative but are not to be considered as limiting. Further, other fuel injection timings are anticipated and included within the scope of the description.

Figure 4:
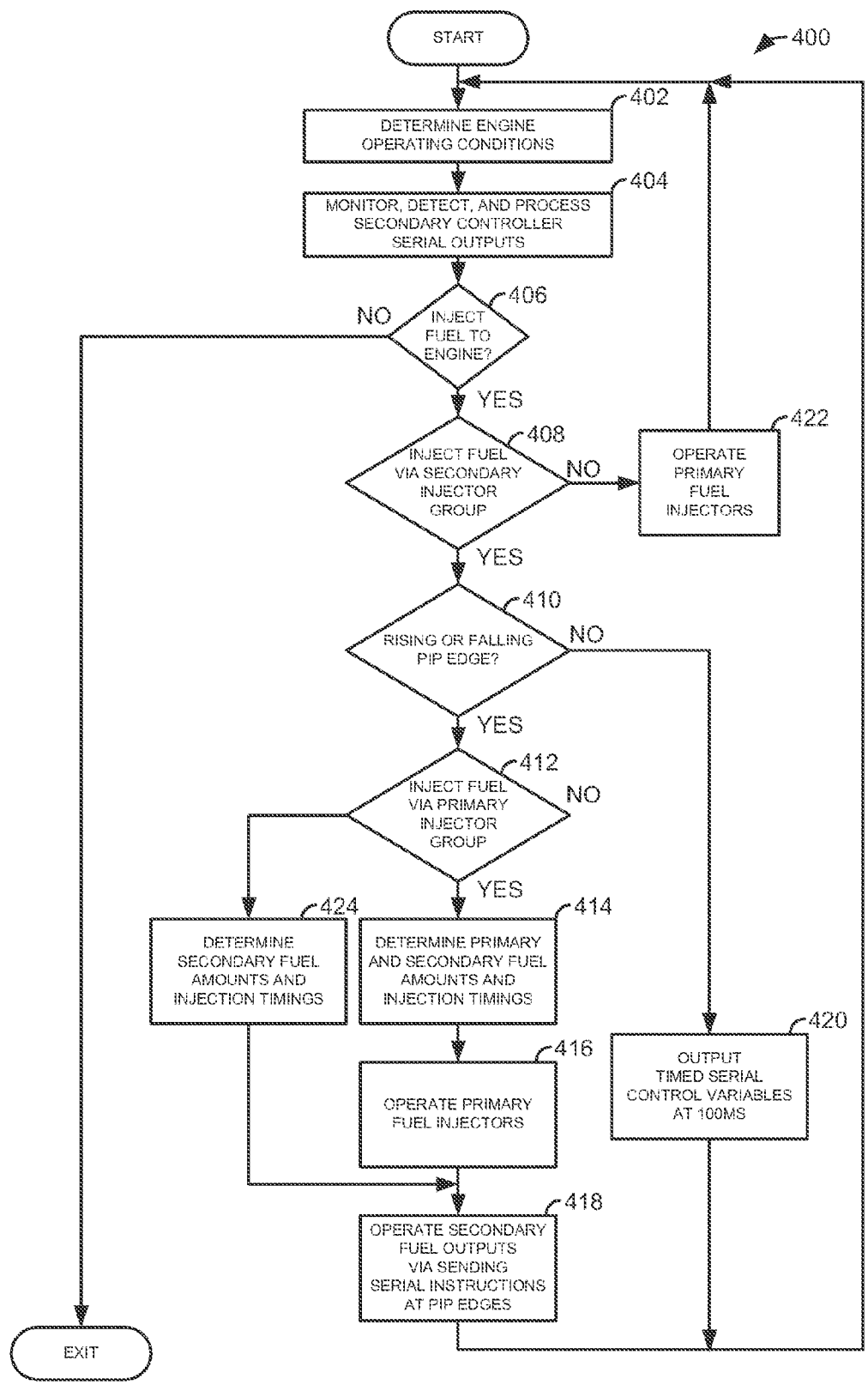
FIG. 4 is an example method for operating a first controller sending fuel injector commands via a sole serial communication bus.

Referring now to FIG. 4, a flowchart of a method for operating a first or primary controller sending fuel injector commands via a sole serial communication bus to a second controller is shown. The method of FIG. 4 may be executed via instructions in controller 12 of the system shown in FIGS. 1 and 2.

At 402, method 400 determines engine operating conditions. Engine operating conditions may include but are not limited to engine speed, engine load, operator torque demand, engine temperature, engine air temperature, and engine position. Method 400 proceeds to 404 after engine operating conditions are determined.

At 404, method 400 monitors an asynchronous communication bus for data broadcast by a secondary controller on to the asynchronous communication bus. Data broadcast to the primary controller may be determined from an identifier that is part of a data packet sent over the serial communication bus. In one example, data packets or messages may be limited to eight bytes of information aside from the message identifier. If a message is detected, method 400 reads the message and updates control parameters within memory based on the data. The control parameters may be used to determine injection timings for a second group of injectors controlled by the secondary controller (e.g., a secondary fuel controller) as well as other control parameters. Method 400 proceeds to 406 after monitoring the serial communication bus for broadcasts from the secondary controller.

At 406, method 400 judges whether or not to inject fuel to the engine. Fuel may be injected to the engine when the engine is rotating and when engine operation is desired by the operator or by a controller. If method 400 judges to inject fuel to the engine, method 400 proceeds to 408. Otherwise, method 400 proceeds to exit.

At 408, method 400 judges whether or not to inject fuel via injectors of a secondary fuel system. The secondary fuel system may include a secondary controller, fuel injectors, and fuel supply as illustrated in FIGS. 1 and 2. In one example, method 400 may judge whether or not to inject fuel to an engine via secondary fuel injectors based on the amounts of fuel in primary and secondary fuel tanks. In other examples, method 400 may judge to begin injection of fuel via the secondary fuel injectors in response to an engine operating condition such as engine load or engine knock. If method 400 judges to inject fuel via secondary fuel injectors, method 400 proceeds to 410. Otherwise, method 400 proceeds to 422 where only primary fuel injectors provide fuel to the engine.

At 422, method 400 operates primary fuel injectors to supply a first fuel to the engine. The primary fuel injectors may be directly operated by the primary controller. In one example, fuel injection timing is based on engine position, engine speed, and engine load. As engine load increases the amount of fuel supplied to engine cylinders may be increased. Further, primary fuel injectors may schedule start of fuel injector opening time based on engine position so that fuel is delivered when an intake valve is closed, when and intake valve is open, or during a specific engine stroke (e.g., during compression stroke). Method 400 returns to 402 after primary fuel injectors are operated.

At 410, method 400 judges whether or not a rising or falling edge of an internally generated repeating digital signal (e.g., 350 of FIG. 3) representative of engine position is present or not. The rising and falling edges provide the timing basis of broadcasting fuel injector commands to the secondary fuel controller from the primary controller via the asynchronous serial communication bus. Method 400 proceeds to 412 if a rising or falling edge is detected. In some examples, the rising and/or falling edges may provide a hardware interrupt to initiate update of fuel injection pulse widths and broadcast of fuel injector timings. If no edge is detected, method 400 proceeds to 420.

At 420, method 400 checks status of a timer to determine if a predetermined amount of time has occurred since time based serial control data (e.g., auxiliary outputs) has been output via the primary controller. If a predetermined amount of time has expired, method 400 broadcasts auxiliary output control data to the secondary controller via the serial communication bus. In this way, method 400 updates auxiliary outputs at a fixed predetermined time interval. Method 400 proceeds to exit after the auxiliary outputs have been updated via the serial communication bus.

At 412, method 400 judges whether or not to inject fuel to engine cylinders via a primary group of fuel injectors. In one example, fuel may be injected to the engine during selected engine operating conditions. For example, fuel may be injected to the engine via the primary group of fuel injectors when engine load is less than or greater than a threshold. Method 400 proceeds to 414 when fuel is to be supplied to the engine via both primary and secondary fuel injectors. Otherwise, fuel is supplied to the engine solely by the secondary fuel injectors and method 400 proceeds to 424.

At 424, method 400 determines secondary fuel amounts and timings. Secondary fuel amounts and timings may be determined via indexing tables and functions holding empirically determined fuel injection timings including start of injector opening time, injector opening time, and/or injector closing time. For example, tables and functions may be indexed via engine speed and load to determine fuel injector opening time. Further, values determined from the tables may be adjusted in response to air-fuel sensor feedback. Method 400 proceeds to 418 after secondary fuel amounts and timings are determined.

At 414, method 400 determines primary and secondary fuel amounts and injection timings. In one example, primary and secondary fuel amounts may be determined from functions or maps that hold empirically determine values and that are indexed via engine speed and load. One or more tables may include injection timings including start of fuel injector opening time in crankshaft degrees, injection opening time or fuel amount, and/or end of fuel injector opening time for both primary and secondary fuel supplied to the engine. Further, values determined from the tables may be adjusted in response to air-fuel sensor feedback. Thus, individual injection times may be provided for two fuels injected via primary and secondary fuel injectors. Method 400 proceeds to 416 after primary and secondary fuel injection timings are determined.

At 416, method 400 operates primary fuel injectors as described above at 422. For example, individual fuel pulses may be determined for each engine cylinder. The individual fuel pulses are output to fuel injectors at empirically determined times so as to inject fuel as selected times during engine rotation so that fuel is injected at desired times. In one example, where fuel is port injected fuel may be supplied to an engine as illustrated in FIG. 3. Method 400 proceeds to 418 after operation of primary fuel injectors is initiated, although in some examples operation of primary fuel injectors may be simultaneous with or after operation of secondary fuel injectors.

At 418, method 400 outputs fuel injector commands that apply to the second group of fuel injectors supplying a secondary fuel to the engine from the primary controller to the secondary controller. Specifically, method 400 outputs revised fuel injectors timings (e.g., fuel injector opening time, fuel injector pulse width or open time, fuel injector close time) from the primary controller to the secondary controller via the serial communication bus. The fuel injector data may be output at timings and in the format described with regard to FIG. 3. The fuel injector data is time stamped and shipped with a cylinder identifier so that engine position may be identified by the secondary controller. Method 400 returns to 402 after revised fuel injector timings are output to the secondary fuel controller via the asynchronous serial communications bus.

Thus, the method of FIG. 4 provides for a primary controller broadcasting fuel injector commands and auxiliary output commands to a secondary controller based on engine position and fixed time intervals. Further, the method of FIG. 4 allows the primary controller to receive messages to update control parameters observed by the secondary controller. In this way, the serial communication bus provides enough information between two controllers so that fuel injectors of a second group of fuel injectors controlled directly by the second controller may be operated synchronous with engine operation to provide sequential fuel injection of a second fuel.

Figure 5:
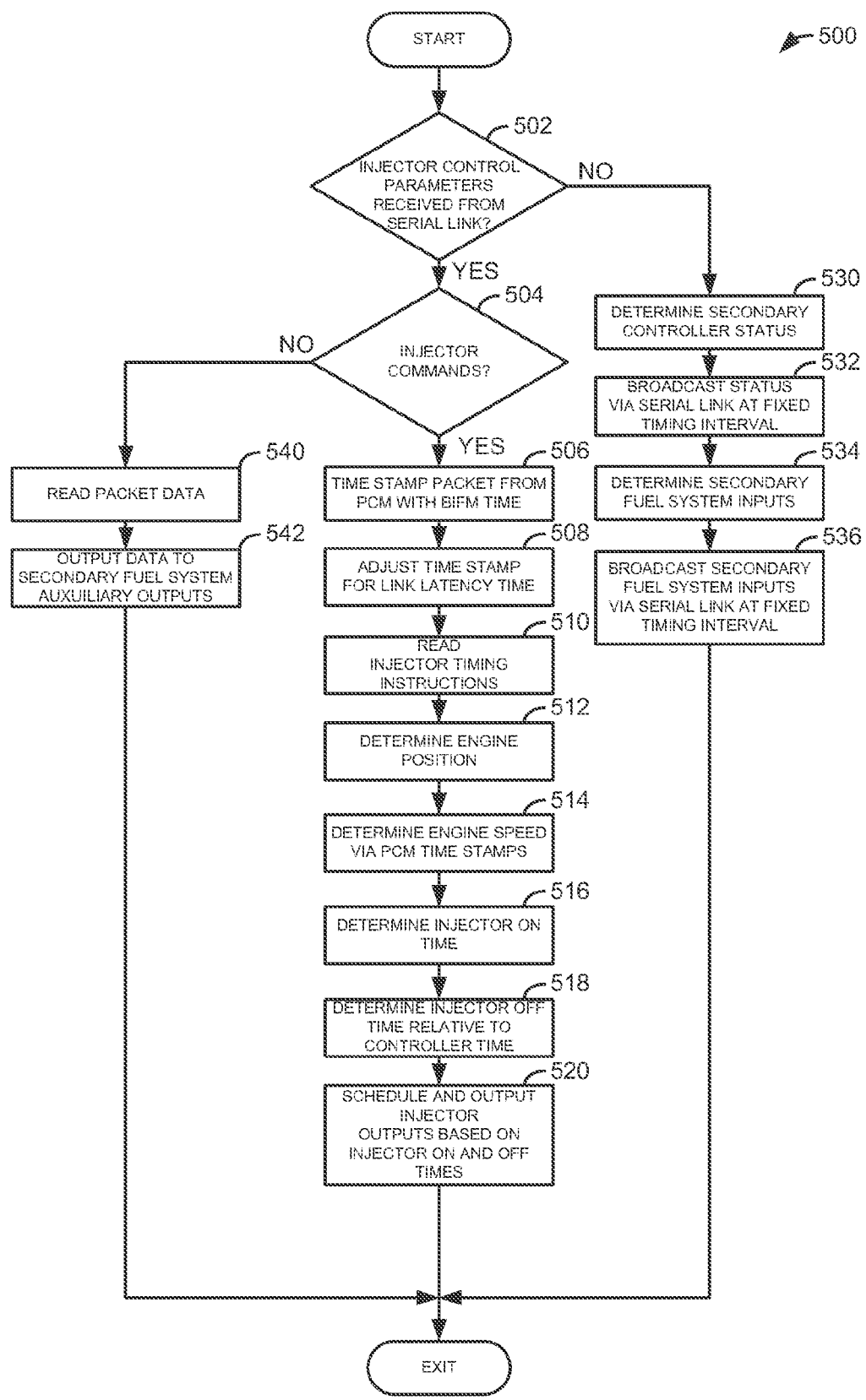
FIG. 5 is an example method for operating a second controller receiving fuel injector commands via a sole serial communication bus.

Referring now to FIG. 5, a flowchart of an example a method for operating a second or secondary controller receiving fuel injector commands via a sole serial communication bus from a primary controller is shown. The method of FIG. 5 may be executed via instructions in controller 1 of the system shown in FIGS. 1 and 2.

At 502, method 500 judges whether or not fuel injector control parameters have been received by the second controller via a serial communication bus. In one example, a secondary controller monitors the serial communication bus for messages addressed to the secondary controller. If so, method 500 proceeds to 504. Otherwise, method 500 proceeds to 530.

At 530, method 500 determines status of the secondary controller. For example, the status of the secondary controller may include but is not limited to degradation of fuel injectors in a group of fuel injectors directly operated by the second controller. Status of fuel injectors may be determined via sensing a voltage or current. Further, operational status of a CPU in the secondary controller may also be provided via monitoring a watchdog timer or the like. Method 500 proceeds to 532 after status of the secondary controller is determined.

At 532, method 500 broadcasts the status of the secondary controller to the primary controller via the serial communication bus. The secondary controller status may be broadcast at fixed time intervals (e.g., 100 ms) in order to reduce serial bus traffic. The messages sent via the secondary controller have a lower priority level than the messages sent via the primary controller. In some examples, the secondary controller status may only be sent out when degradation is determined. The secondary controller status may be broadcast in a format is described with regard to FIG. 3. Method 500 proceeds to 534 after secondary controller status is broadcast.

At 534, method 500 determines the state of inputs to the secondary fuel system (e.g., fuel pressure and fuel temperature). The status of secondary fuel system inputs may be determined via reading digital and analog inputs to the secondary fuel controller. Method 500 proceeds to 536 after secondary fuel system inputs have been determined.

At 536, method 500 broadcasts the secondary fuel system inputs from the secondary controller to the primary controller via the serial communication bus. The secondary fuel system inputs may be broadcast at fixed time intervals (e.g., 100 ms) in order to reduce serial bus traffic. The secondary fuel system inputs may be broadcast in a format is described with regard to FIG. 3. Method 500 proceeds to exit after secondary fuel system inputs are broadcast to the primary controller.

At 504, method 500 judges whether or not fuel injector control commands have been received by the secondary controller over the serial communications bus. If so, method 500 proceeds to 506. Otherwise, method 500 proceeds to 540.

At 540, method 500 reads the data packet received from the primary controller and determines what if any states of auxiliary outputs have changed since a last auxiliary output command was received. Method 500 proceeds to 542 after the data packet is read.

At 542, method 500 outputs commands to the auxiliary outputs (e.g., fuel regular solenoid and fuel gauge) of the secondary controller. The auxiliary outputs may include digital and analog outputs. In some examples, the auxiliary outputs sent to the secondary controller may be combined with combinational logic to affect the states of other secondary fuel system control parameters. In other examples, the auxiliary outputs may be received and simply transferred to adjust the states of auxiliary outputs. Method 500 proceeds to exit after auxiliary outputs are updated.

At 506, method 500 time stamps a data packet with time of the secondary controller. A time stamp may be provided by storing time of the secondary controller with the data packet. The time stamp reflects internal or local time of the secondary controller. The time stamp provided by the secondary controller allows the secondary controller to provide accurate timings for outputting or changing the state of variables referenced to secondary controller time. For example, the secondary time stamp allows the secondary controller to determine how long a fuel injector has been turned on. Further, the secondary time stamp allows the secondary controller to determine the amount of time between fuel injector updates. Method 500 proceeds to 508 after the data packet is time stamped.

At 508, method 500 reads and adjusts the primary controller time stamp stored with the injector control data for the latency time it takes to broadcast the injector control data over the serial communication bus. In one example, the primary controller time stamp is reduce by 2 ms, although other times may be calibrated to compensate for different latency times. It should be mentioned that the time stamp adjusted at 508 is not the time stamp applied at 506. Rather, the time stamp at 506 remains without adjustment. Method 500 proceeds to 510 after the primary controller time stamp is adjusted.

At 510, method 500 reads fuel injector timing instructions. Fuel injector timing instructions may include fuel injector pulse width, fuel injector start of opening time, and/or fuel injector closing time. In some example, start of fuel injection time may be preprogrammed as a constant angular position for each engine cylinder to reduce the amount of fuel injector control parameters broadcast over the serial communication bus. For example, start of fuel injection time for each cylinder may be defined as 120 crankshaft degrees before top-dead-center compression stroke of the cylinder receiving the fuel. Thus, fuel injection to a cylinder starts 480 crankshaft degrees before intake stroke of the cylinder begins. In this way, fewer fuel injection commands may be broadcast. Method 500 proceeds to 512 after fuel injector instructions are read.

At 512, method 500 determines the present engine position based on the fuel injector control data. The fuel injector control data includes a variable syn_ctr that identifies a cylinder that is presently at the end of a compression stroke or on an expansion stroke. Specifically, syn_ctr transitions to a value of 1 when cylinder number one is 10 crankshaft degrees before top-dead-center compression stroke until a time when cylinder number three is 10 crankshaft degrees before top-dead-center compression stroke at which time the value of syn_ctr transitions to a value of 3. Thus, syn_ctr provides engine position information. The fuel injector control data also includes a variable pip_edge which identifies whether the edge where the fuel injector control commands (e.g., the packet) where sent out by the primary controller over the serial communication bus were rising or falling. In one example, the rising edge corresponds to an engine position of 10 crankshaft degrees before top-dead-center compression stroke and the falling edge corresponds to a position of 80 past top-dead-center compression stroke. Thus, from the value of syn_ctr and pip-edge the engine position where the fuel injector commands where output can be determined. For example, if syn_ctr is 1 and pip_edge is 0 (rising edge) engine position is 10 crankshaft degrees before top-dead-center compression stroke. In this way, the second controller may determine engine position based on the time when the data is received via the serial communication bus and the injector control data that is within the data packet.

In some examples, a signal such as 350 of FIG. 3 may be input to the secondary controller as shown at 5 of FIGS. 1 and 2. In such a case, the edges of the signal and the value of syn_ctr are the basis for determining engine position. For example, where a rising edge corresponds to an engine position of 10 crankshaft degrees before top-dead-center compression stroke and the falling edge corresponds to a position of 80 past top-dead-center compression stroke. Engine position is 10 crankshaft degrees before top-dead-center compression stroke cylinder number one when syn_ctr equals one and when a rising edge in signal 350 is detected. Engine position between edges may be determined from engine speed and time since a last edge is received. For example, if engine speed is 1000 RPM (6 deg/ms) and 6 ms have passed since a last edge is detected via a received fuel injector control command or via a hardwired signal, the engine position may be determined to have moved one crankshaft degree. Method 500 proceeds to 514 after engine position is determined.

At 514, method 500 determines engine speed via primary time stamps retrieved from the injector control command packets. Since fuel injector control commands are sent out at specific engine positions, engine speed can be determined from time stamps when the fuel injector control data was sent out. For example, if a first fuel injector control command is sent out by the primary controller at 1000 ms (according to the primary controller clock) and a second fuel injector control command is sent out by the primary controller at 1024 ms (according to the primary controller clock) and where there are 90 crankshaft degrees between where fuel injector control commands are sent out, it may be determined that engine speed is 625 RPM (e.g., (90/24 deg/ms)*(1/360 rev/deg)* (60000/1 ms/min)). Method 500 proceeds to 516 after engine speed is determined.

At 516, method 500 determines fuel injector on time. Fuel injector turn on times are determined referenced to when edges are received via hardwire repeating digital signal 5 of FIGS. 1 and 2, or relative to times when fuel injector commands are sent by the primary controller since the timing of primary controller commands with regard to fuel injector control is engine position based. For example, if it is desired that fuel injection for a selected cylinder begins 480 crankshaft degrees before intake stroke of the selected cylinder begins, a timer can be loaded with an amount of time to count down that corresponds to an amount of time that it will take for the engine to travel the distance from a time an edge or fuel injector command instruction is received to the engine position where it is desired that the fuel injector be turned on. When the timer reaches zero the fuel injector may be activated. In other examples, the counter may count up if desired. Method 500 proceeds to 518 after injector opening time and position are determined.

At 518, method 500 determines fuel injector opening time. Method 500 reads fuel injector opening time from the fuel injector command read at 510. However, the amount of time that the fuel injector is turned on is based on time of the secondary controller. For example, if the fuel injector on time is 60 ms as determined at 510, method 500 uses the clock of the secondary controller to count down 60 ms or count up to 60 ms from the time the injector is activated. Method 500 proceeds to 520 after the fuel injector opening time is determined.

At 520, method 500 outputs fuel injector commands via commanding drivers to supply current or cut current off to selected fuel injectors. For example, if a fuel injector supplying fuel to cylinder number one is scheduled for opening a counter can count down or up and amount of time since an edge or command associated with an engine position has occurred. When the counter reaches a predetermined value, the injector is activated by supplying current to the fuel injector. The fuel injector is shut off after a second counter reaches a predetermined amount of time as defined in the fuel injector command and as referenced to time of the second controller. Method 500 exits after fuel injector outputs are updated.

Thus, the secondary controller receives fuel injector control commands such as fuel injector pulse width, determines engine position, and directly operates the fuel injectors based on the fuel injector control commands. In addition, the secondary controller adjusts auxiliary outputs and provides status information to the primary controller.

As will be appreciated by one of ordinary skill in the art, methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
   a first group of fuel injectors;
   a second group of fuel injectors;
   a serial communication bus;
   a first controller including instructions for directly driving the first group of fuel injectors and supplying commands via the serial communication bus to operate the second group of fuel injectors; and
   a second controller including instructions for receiving the commands via the serial communication bus and directly driving the second group of fuel injectors, where the first group of fuel injectors and the second group of fuel injectors supply different fuel types to an engine, and where the commands include fuel injector pulse widths, and where the fuel injector pulse widths are sent over the serial communication bus at a timing that is responsive to engine position.

2. The engine system of claim 1, where the serial communication bus is an asynchronous serial communication bus, and where the serial communication bus includes priority based arbitration.

3. The engine system of claim 1, where the timing is a multiple of combustion events in the engine.

4. The engine system of claim 1, further comprising additional controller instructions within the first controller for receiving status information from the second controller.

5. The engine system of claim 1, further comprising controller instructions within the second controller for relaying fuel control parameters to the first controller via the serial communication bus.

6. A system, comprising:
   a first group of injectors;
   a second group of injectors;
   a first controller including instructions for commanding the first group of injectors via a first group of instructions and the second group of injectors via a second group of instructions, the first controller directly driving the first group of injectors; and
   a second controller including instructions for directly driving the second group of injectors via the second group of instructions, and additional instructions within the second controller for estimating position of an engine from an input that receives a digital pattern that repeats every cycle of the engine.

7. The system of claim 6, further comprising a sole serial communication bus electrically coupling the first controller to the second controller, and further comprising additional instructions within the first controller for broadcasting a second group of instructions to the first controller via the serial communication bus.

8. The system of claim 6, where the input receives a time stamp from the first controller, and further comprising additional instructions within the second controller for estimating position of an engine based on the time stamp.

9. The system of claim 8, further comprising additional instructions within the second controller for determining an injector off time based on a time the second controller receives the second group of instructions.

10. A method for operating an engine, comprising:
    directly driving a first group of fuel injectors via a first controller;
    supplying fuel injector pulse width data from the first controller to a second controller via a sole asynchronous serial communication bus; and
    directly driving a second group of fuel injectors based on the fuel injector pulse width data via the second controller.

11. The method of claim 10, further comprising supplying a signal to the second controller, the signal including a repeating digital pattern during every cycle of an engine.

12. The method of claim 10, further comprising estimating engine speed within the second controller via a time stamp from the first controller and engine position data supplied from the first controller to the second controller.

13. The method of claim 10, further comprising sending the fuel injector pulse width data from the first controller to the second controller at selected positions of the engine.

14. The method of claim 13, where the second controller determines fuel injector off time based on a second controller time stamp of when the second controller receives fuel injector pulse width data from the first controller.

15. The method of claim 10, further comprising providing status information from the second controller to the first controller via the sole asynchronous serial communication bus.

16. The method of claim 10, further comprising providing fuel data from the second controller to the first controller via the sole asynchronous serial communication bus.

17. The method of claim 10, further comprising providing auxiliary output data from the first controller to the second controller via the sole asynchronous serial communication bus.

* * * * *